United States Patent
Corcelle et al.

[11] 3,743,776
[45] July 3, 1973

[54] DEVICE FOR TRACING SEAMS FOR WELDING BY ELECTRON BOMBARDMENT

[76] Inventors: Francois Corcelle, 70 bis rue du Docteur Oge, Montlhery; Jean Angely, 153 bis Avenue de la Republique, Villejuif; Jean-Pierre Delort, 21 rue de la Condamine, Paris, all of France

[22] Filed: May 5, 1971

[21] Appl. No.: 140,399

[30] Foreign Application Priority Data
May 5, 1970  France .............................. 7016360

[52] U.S. Cl. .......................................... 219/121 EB
[51] Int. Cl. ............................................. B23k 15/00
[58] Field of Search ............... 219/121 R, 121 EM, 219/121 EB; 250/49.5 R, 49.5 A

[56] References Cited
UNITED STATES PATENTS

| | | |
|---|---|---|
| 3,609,288 | 9/1971 | Sciaky..................... 219/121 EM |
| 3,426,174 | 2/1969 | Graham et al. ............... 219/121 EM |
| 3,329,813 | 4/1967 | Hashimoto........................ 250/49.5 |
| 3,513,285 | 5/1970 | Imura........................... 219/121 EM |
| 3,472,997 | 10/1969 | El-Kareh et al............... 219/121 EB |
| 3,152,238 | 10/1964 | Anderson...................... 219/121 EB |
| 3,276,902 | 10/1966 | Abraham .................. 219/121 EM X |

*Primary Examiner*—J. V. Truhe
*Assistant Examiner*—Gale R. Peterson
*Attorney*—Sughrue, Rothwell, Mion, Zinn & Macpeak

[57] ABSTRACT

This invention concerns electron bombardment welding techniques. The invention teaches a method and a device for keeping a welding beam centered on a seam plane. The detector includes two detectors arranged symetrically with respect to a seam plane. They furnish a signal whose amplitude increases as the electronic beam spot moves away from the seam plane center and approaches the edge of one of the pieces being joined. A servo-system, without oscillation, brings the beam back into the axis of the seam plane. The device can be used in welding big pieces.

6 Claims, 3 Drawing Figures

DEVICE FOR TRACING SEAMS FOR WELDING BY ELECTRON BOMBARDMENT

BACKGROUND OF THE INVENTION

The invention pertains to a method and a device which makes it possible, during the course of electron bombardment welding, to keep the electron beam on the seam between two pieces to be welded together, without manual action.

The electron welding beam spot must be kept on the seam with good precision if we want to benefit from the advantages derived from the strong penetration power of such an electron beam. This beam placement is relatively easy when the position of the pieces to be welded together is defined with sufficient precision with respect to the beam and when the welding joint has a simple geometric shape. But this is not the case when the seam line has just any shape.

Most of the earlier devices make it possible to perform precision welding only by using very precise mechanical systems. With such devices, it is not possible to weld big boiler pieces, because of the weight of these pieces and because of the imprecision with which their forms are known.

A more reliable device has been perfected. This device is described in French Pat. No. 1,589,437, filed on May 6, 1968. This device employs a screen whose edge has exactly the same shape as the welding line to be made. The edge of this screen is placed parallel to the line which the spot must follow, at a small distance from the spot. By deflecting the beam with respect to the welding line, we can lead the spot to the edge of this screen. We can thus verify its position which we then correct if necessary.

An even more recent device consists in beforehand chamfering the same inclination of the edges of the two pieces to be welded and to use the electrons, which are back scattered by these chamfers, in order to keep the beam on the welding line. Another device causes the beam line to be palpated in advance by a beam with reduced power and thus corrects the direction of the beam little by little.

Although these devices offer a partial solution to the problem, they nevertheless require preparatory work which causes loss of time and money and which also introduces a certain impression in the position of the beam.

SUMMARY OF THE INVENTION

This invention makes it possible to remedy these inconveniences and to guarantee optimum positioning of the electron beam with respect to the plane of the seam in the course of welding two pieces of any shape together.

The invention employs the back scattered electrons of the incident beam. It is based on the following finding: So long as the beam is kept in the axis of the plane of the seam, back scattering is weak. The moment the beam moves very slightly away from its position and comes to hit directly on a surface next to the seam plane in the course of welding, the back scattering intensity grows abruptly in a dissymmetrical fashion.

The method involved in this invention concerns the maintenance of the welding electronic beam in the plane of the seam of the two pieces to be welded together by using the measurement of the flow of primary back scattered electrons and is characterized by the fact that an increase in the flow of back scattered electrons along the edge of one of the pieces controls a transverse displacement of the beam and brings it back into the seam plane at its optimum position.

The device which employs the above method includes two back scattered electron pick up probes, arranged in a symmetrical fashion on either side of the seam plane. These probes are connected to an electronic and safety servo-system and are further characterized by the fact that they are so oriented that they will exclusively pick up the flow of electrons back scattered by the plane of the seam and the edge of the two pieces to be welded together.

The device described above offers the advantage of using probes having a simple circular cylindrical form and is characterized by the fact that these probes are equipped, at their inputs, with a screen in which an opening has been made, the diameter of this opening being adapted to the intensity of the incident welding beam. Further, the probes are characterized by the fact that self-polarization keeps them at a potential that eliminates charges other than the true back scattered electrons.

We thus get rapid, repetitive and precise measurements. In order to exploit them completely, it is necessary to use a servo-system which will enable us very rapidly to return the beam to the center of the seam line without producing a transverse oscillatory movement which is particularly bad in a welding operation.

The device described above thus includes a servo-system which keeps the beam in the center of the seam line and which returns it there without oscillation in the case of deviation from the welding line. It is characterized by the fact that the probes are connected through a differential amplifier to a digital/analog converter with N stages, the output of which is a potential proportional to the displacement of the beam spot from the center of the seam plane. The output from the digital/analog converter is applied to a differential amplifier, thence applying on the deflection coils a signal whose amplitude depends directly on the difference between the voltage furnished by the differential amplifier to the digital/analog converter and a pre-set voltage, so that the amplitude is cancelled out when this difference becomes zero.

Finally, to make the device reliable, it is necessary to provide for the case in which the spot, having left the seam plane, would have a tendency to move away abnormally, for example, as a result of the breakage of an element in the circuits employed in the adjustment of the position of the beam.

The device according to the invention thus involves a safety system characterized by the fact that it consists of two gates with pre-set thresholds, acting by any known device, in order to warn the operator to reduce the power of the beam when the signal has reached an anticipated threshold value and that the spot is moving away from the welding plane by a pre-determined quantity.

BRIEF DESCRIPTION OF THE DRAWINGS

Other features and advantages of the invention will emerge from the following description of the invention when read with the accompanying drawings wherein.

DETAILED DESCRIPTION OF THE PREFERRED EMBODIMENTS

Figure 1:
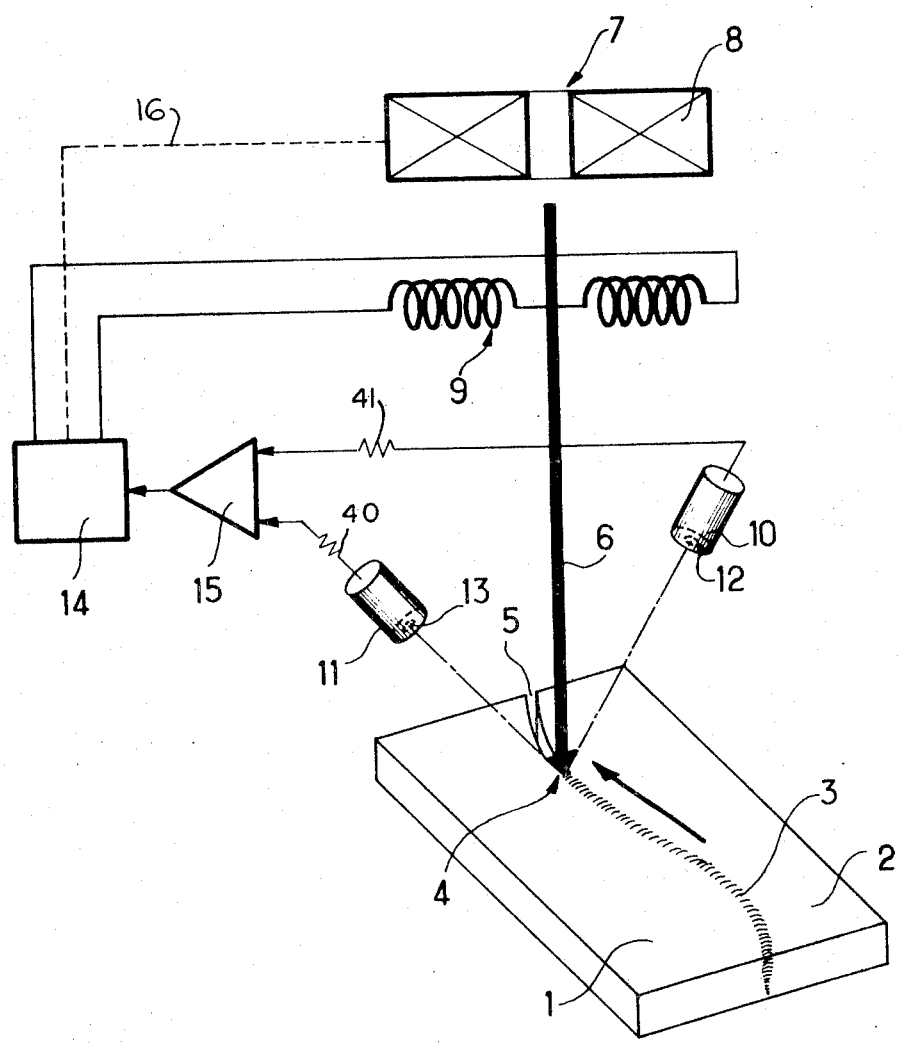
FIG. 1 illustrates the basic circuit diagram of a device for carrying out the teachings of the invention.

With respect to FIG. 1, there is shown at 1 and 2 two pieces to be welded together, represented schematically by two plates which are joined up to 4 by a welding seam 3. The nonwelded parts of pieces 1 and 2 are separated by a very narrow slot 5. An electronic beam 6 is furnished by a gun 7 and its beam concentration device is symbolized by a coil 8. The deflection system 9 can divert the beam 6. On either side of the line of the seam, we have probes 10 and 11, in the shape of diaphragm-equipped cylinders with openings, such as 12 and 13, adapted to the power of the beam 6. These probes are connected to a servo-system 14, equipped, at the input, with a differential amplifier 15, acting upon the deflecting system 9. Finally, we note the safety line 16 which controls the beam concentration device. When the seam line of the two pieces is straight and when the beam is correctly regulated, the welding operation goes on without any trouble; the two identical probes, which are placed symmetrically with respect to the plane of the seam, collect equal charges if the openings 12 and 13 are equal and if the two probes are at the same distance from the pieces in the course of welding. If, for an undetermined reason, the beam 6 leaves the plane of the seam or if the welding line ceases to be straight, one of the two detectors, the right-hand detector, for example, will collect a bigger charge and as a result a signal will be transmitted to the servo-system 14, through the differential amplifier 15. This servo-system will deliver a signal to the deflection coil 9 so as to displace the beam 6 toward the left and bring it back to 4.

It goes without saying that the flow of back scattered electrons undergoes very rapid increase when the spot progressively leaves the welding line. The moment we have the slightest deviation of the spot, we thus get a signal sufficient to bring about the action of the servo-system 14.

In order to prevent inhibiting the probes, it was necessary to adapt, at the input of these probes, a diaphragm whose opening is adapted to the welding power used so as to furnish a sufficient signal the moment the beam has left the center of the seam plane and to continue to furnish a signal with a not excessive value when the spot ceases to be partially absorbed by the seam plane.

A system for the self-polarization of the probes prevents them from collecting the thermal electrons and the ions of all kinds which are found abundantly above a welding line during the time the beam is functioning. This self-polarization can be obtained very simply by putting a resistance 40, 41 in series with the conductor coming out of the probe before the differential amplifier 15 of the servo-system 14. After the initial moment, the current, which flows through this resistance, polarizes the probe with respect to the ground. We regulate the value of this resistance so that the probe will pick up only the true back scattered electrons.

Figure 2:
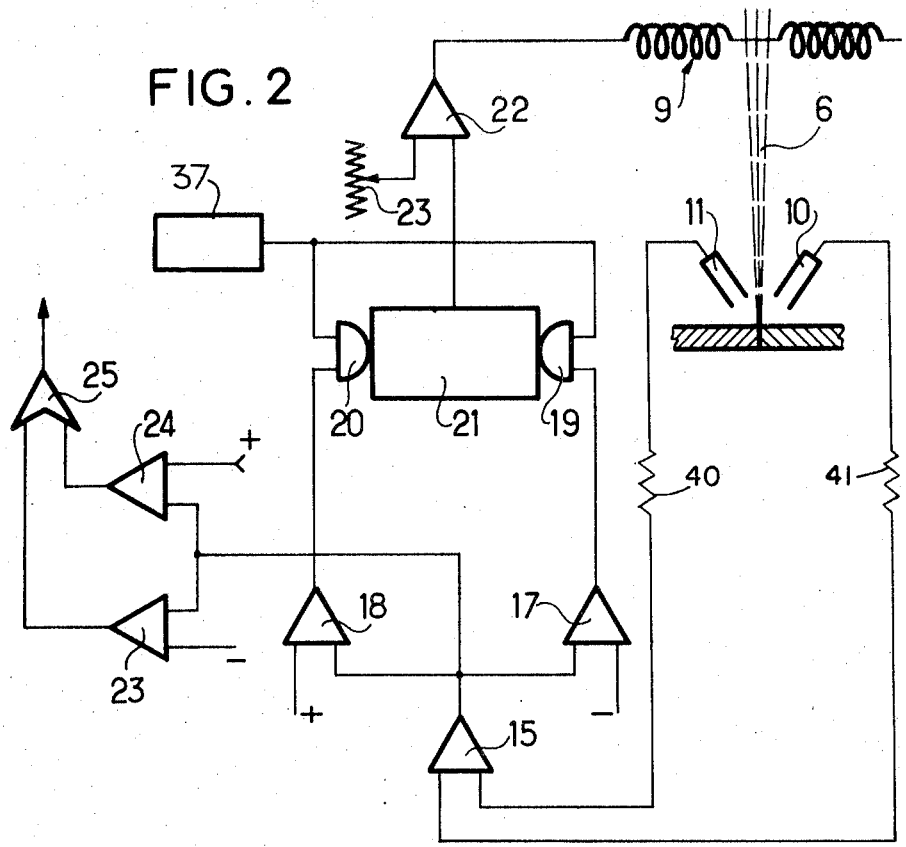
FIG. 2 illustrates the details of the servo-system of the invention.

FIG. 2 illustrates in greater detail the servo-system of the present invention.

The conductors coming out of probes 10 and 11 lead to the differential amplifier 15 which is placed at the input of the servo-system. The output of the differential amplifier 15 is connected to two threshold gates 17 and 18. The gates control, respectively, the logic gates 19 and 20. These gates are connected on either side to a digital/analog converter 21 with N steps.

Element 21 is responsive to pulses from pulse source 37 and produces an analog output proportional to the displacement of the beam spot from the center of the seam plane. Thus, it can be seen that element 21 functions as digital to analog converter and will hereinafter be so identified.

The digital/analog converter acts upon the differential amplifier 22, one of whose inputs 23 is kept at a potential equal to one-half the voltage which the converter would deliver for N steps. This differential amplifier in turn acts upon the deflection coils 9 of the electron gun.

When the electron beam centered upon the seam plane moves ever so slightly away from the center of the seam plane causing a portion of the spot to be back scattered by the flat surface of one of the pieces in the course of welding, there is an increase in the signal transmitted by the probe, which is on the side toward which the spot has moved. The differential amplifier 15 then transmits a signal which will be positive or netative, depending upon whether it comes from probe 10 or 11. The size of this signal depends on the intensity of the back scattered flow, and hence, on the quantity by which the spot has moved away from the center of the seam joint. When this magnitude is greater than a value $\epsilon$ determined in advance, the threshold gate 18 transmits the signal to the logic gate 20. If, on the other hand, the signal was negative, it would then correspond to information picked up by probe 11, and the threshold gate 17 would allow the signal to pass if the latter were negative and if it has an absolute value greater than $\epsilon$. The latter, in turn, would then open the logic gate 19.

The logic gate 20 starts the counting in the digital-/analog converter 21 when the voltage, coming from the differential amplifier 15, is positive, while as the logic gate 29 starts the deduction in the digital/analog converter 21 when the voltage coming from the differential amplifier is negative. The digital/analog converter 21 with N steps is placed, in the initial state, in position N/2, in such a manner that its output voltage will be equal to half of the voltage $V_N$ which it would deliver for N steps. The other input to the differential amplifier 22 is a fixed voltage equal to the voltage $V_N/2$ so that, if the beam is correctly directed after the initial moment, there is no action upon the deflection coils, so long as the voltage delivered by the digital/analog converter 21 has not varied, in terms of absolute value, by a value greater than $V_N/N$.

If the displacement of the beam involves an action of the differential amplifier 15 and then one of the threshold gates 17 or 18 and finally the opening of one of the gates 19 or 20, the digital/analog converter 21 delivers a voltage $V''$ which is different from the voltage $V_N/2$.

The voltage difference $$V'' - V_N/2$$

at the input of the differential amplifier 22 furnishes, at its output, a signal to the coils 9 which brings about a displacement of the spot toward the left, in the assumption visualized here. The electron beam thus tends to come back to the welding line. It progressively ceases to be retrodiffused in a dissymmetrical fashion and the amplifier retains its last value. The beam has then come back to its balanced position.

In FIG. 2, we can also see a safety device involving two threshold gates 23 and 24, adjusted for voltages corresponding to the signal which the probes would furnish if the beam were to deviate in a noteworthy fashion. In this case, one of the threshold gates 23 or 24 would act upon a device 25, which is known in itself, which modifies the voltage applied to the electron gun and reduces the power of the beam while at the same time it gives rise to a signal intended for the operator.

Figure 3:
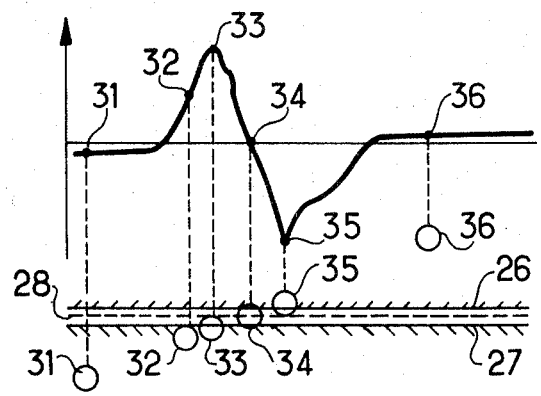
FIG. 3 is a graph of the currents sensed by the probes as a function of the spot position.

FIG. 3 gives us a better understanding of the operation of the servo-device and the safety system by showing a graphic image.

For a certain adjustment of probes 11 and 12, we have shown, in arbitrary units, the current furnished at the output of the differential amplifier 15 when the spot occupies the positions 31, 32, 33, 34, 35, and 36 with respect to the edges 26 and 27 of the two pieces to be welded together.

We can see that the current is zero when the spot occupies the position 34 exactly on the median line of the seam plane and also touches the two edges of the two pieces.

We also note that the moment the spot clearly hits the edge 26 or 27 of the pieces 1 and 2 which are to be welded together, the current passes through a maximum. It is thus possible to regulate the safety threshold gates 23 and 24 in keeping with values corresponding to the positions 33 and 35 and thus to prevent the beam, at full power, from attacking the positions 32 or 31 or 36, which would damage the pieces to be welded.

Finally we must note that the method does not require the initial precise positioning of the beam on the welding seam. The device involved in this invention is in effect capable of detecting the seam with sufficient precision so that the servo-syytem begins to operate and then itself places the beam in the optimum welding position.

What is claimed is:

1. A device for keeping an electronic welding beam, operating with its full intensity, centered in a seam plane comprising:
   an electron gun, including deflection coils for producing said welding beam,
   a pair of detectors disposed symmetrically about said seam plane for measuring the flow of primary back scattered electrons resulting from said welding beam, the flow of primary back scattered electrons received by one of the detectors abruptly increasing as the welding beam intersects an edge of one of the pieces being welded along the seam plane,
   means, coupled to said detectors, for producing a signal indicative of the difference in the flow of said primary back scattered electrons measured by said probes and means responsive to said signal for controlling said deflection coils to center said welding beam in the seam plane in response to the compared value of said flow.

2. The device of claim 1, wherein said means for producing said difference indicative signal includes first differential amplifier means coupled to said probes, said means for controlling including digital to analog converter means for producing a potential proportional to the output of said differential amplifier means, means for generating a pre-set voltage, and second differential amplifier means, one input of said second differential amplifier means being coupled to said pre-set voltage generating means, another input of said second differential amplifier means being connected to the output of said digital to analog converter means, the output of said second differential amplifier means being coupled to said deflection coils.

3. The device of claim 2, further including resistance means serially connected between said probes and said first differential amplifier means for blocking thermal electrons and ions for entering the probes whereby said probes receive only back scattered electrons.

4. The device of claim 3, wherein said probes are cylindrical in shape, the inputs thereto including a screen having an aperture, the diameter thereof being caused to vary in accordance with the intensity of the incident welding beam.

5. The device of claim 4, wherein said means for controlling further includes a safety system comprising: threshold gates means coupled to said first differential amplifier means, an operator signal and control means coupled to said threshold gate means for generating and operator signal and decreasing the electron beam power in response to an output from said threshold gate means indicating that the beam spot has deviated from the seam plane by a predetermined amount.

6. The device of claim 2 further including; a pulse source for altering the digital content of said digital to analog converter, a pair of coincident gates receiving pulses from said pulse source and coupled respectively to an incrementing and decrementing input of said converter, threshold gate means coupled between said first differential amplifier and said pair of coincident gates for selectively enabling one of said gates in response to the polarity of a signal having at least a predetermined value from said first differential amplifier.

* * * * *